(12) United States Patent
Schulte

(10) Patent No.: US 6,200,009 B1
(45) Date of Patent: Mar. 13, 2001

(54) REARWARD ILLUMINATION DEVICE FOR OUTBOARD MOTOR

(76) Inventor: Joseph G. Schulte, 399 Autumn Chase Dr., Venice, FL (US) 34292

( * ) Notice: Subject to any disclaimer, the term of this patent is extended or adjusted under 35 U.S.C. 154(b) by 0 days.

(21) Appl. No.: 09/384,328

(22) Filed: Aug. 27, 1999

Related U.S. Application Data

(60) Provisional application No. 60/102,423, filed on Sep. 30, 1998.

(51) Int. Cl.$^7$ ........................................ B60Q 1/00
(52) U.S. Cl. ........................ 362/477; 362/540; 340/984
(58) Field of Search .................... 362/477, 540; 440/1, 2, 86, 113; 340/985, 984

(56) References Cited

U.S. PATENT DOCUMENTS

| | | | |
|---|---|---|---|
| 3,737,651 | 6/1973 | Shute | 362/222 |
| 3,870,875 | 3/1975 | Altimus | 362/477 |
| 4,903,007 | 2/1990 | Gottlieb | 340/474 |
| 5,047,747 | 9/1991 | Gottlieb | 340/463 |
| 5,080,619 * | 1/1992 | Uchida | 440/84 |
| 5,230,643 * | 7/1993 | Kanno | 440/86 |
| 5,613,886 | 3/1997 | Cribbs | 440/2 |
| 5,719,552 | 2/1998 | Thompson | 340/431 |

* cited by examiner

Primary Examiner—Sandra O'Shea
Assistant Examiner—Hargobind S. Sawhney
(74) Attorney, Agent, or Firm—Harness, Dickey & Pierce, PLC

(57) ABSTRACT

A marine illuminating device for aiding in the reverse navigation of a watercraft that is powered by an outboard motor. The marine illuminating device includes an electric light that is mounted in an aperture in a cowl of an outboard motor. The electric light is connected through an electric circuit to the alternator/charging system of the outboard motor and to a switch assembly. The switch assembly may be actuated automatically when the outboard motor mode selector is positioned into the reverse mode. Alternatively, the switch may also be actuated manually. Actuation of the switch assembly permits electric current to flow from the alternator/charging system to the electric light, thereby causing the electric light to illuminate. Operation of the device is "hands-free" due to the fact that it illuminates automatically and does not require the operator to actively position the light relative to the path of the watercraft since the watercraft travels in the direction that the outboard motor is pointed when the motor is operated in the reverse mode. The electric circuit may also employ a switching device to maintain the electric lamp in an illuminated state for a predetermined time to permit the watercraft operator to momentarily operate the outboard motor in the neutral or forward modes while maintaining rearward illumination.

22 Claims, 2 Drawing Sheets

REARWARD ILLUMINATION DEVICE FOR OUTBOARD MOTOR

This application claims benefit of 60/102,423 filed Sep. 30, 1998.

BACKGROUND OF THE INVENTION

1. Technical Field

The present invention relates generally to marine lighting systems and more particularly to an illumination device which is mounted to a rearward facing portion of an outboard motor and activates when the motor is reversed.

2. Discussion

Currently, commercially marketed watercraft powered with outboard motors are equipped with U.S. Coast Guard specified navigation lights that serve to mark the port (left), starboard (right), and stem (rear) of the watercraft when these lights are activated during operation of the watercraft in conditions of little or no light. These lighting systems are intended to assist other watercraft operators in identifying the presence of another watercraft and the direction in which it is traveling, but not to facilitate the operation of the watercraft by illuminating the path along which the watercraft operator wishes to travel. It is therefore common practice for these operators to utilize hand-held spotlights when navigating during low-light conditions.

The use of a spotlight when operating such watercraft can be difficult at times since the operator must perform a variety of functions, including steering, operation of the throttle and operation of the mode selector (forward-neutral-reverse), in addition to aiming the spotlight. This difficulty is generally little more than an inconvenience when the watercraft is operated in the forward direction as the majority of the time is spent "cruising" from one point to another. During "cruise" periods, manipulation of the throttle and steering adjustments are usually kept to a minimum. Additionally, use of the spotlight is typically intermittent as the operator will rely on other navigational aids, such as a lighted compass, star positions, outlines of landmarks or lights, and/or navigational buoys to maintain his course.

The difficulty in operating the watercraft increases disproportionately, however, when the outboard motor is operated in the reverse mode, especially when the operator is berthing the watercraft. As the reverse mode is not used for "cruising," throttle changes and steering adjustments are frequently made. Therefore, for watercraft powered by an outboard motor having a combination throttle/tiller, it is a practical requirement for the operator to keep one hand on the throttle/tiller while reversing the watercraft so as to control the speed and direction of the watercraft. Since the use of the reverse mode is generally intermittent, the operator's other hand is required to operate the mode selector which is typically a lever located on the side of the outboard motor. The outboard motors of larger watercraft are typically connected to an operator's console having separate steering and combined throttle/mode controls; these throttle/mode controls provide the capability of switching the operation of the outboard motor into forward, neutral and reverse modes as well as adjusting the speed of the watercraft. In such watercraft, it is therefore essential for the operator to keep one hand on the steering controls and the other hand on the throttle controls.

While berthing, it is advantageous for the operator to have the capability to quickly switch between the forward, neutral and reverse modes so as to improve the speed and precision by which the watercraft is being maneuvered, especially where there is a chance that the outboard motor could collide with an object, such as a dock, a mooring shore or another watercraft. Thus, where the watercraft is equipped with an operator's console, the operator is more inclined to keep one hand on the throttle/mode controls while the other hand remains on the helm or steering wheel. Similarly, the operator who uses an outboard with a combination throttle/tiller desires to have one hand free to operate the mode select mechanism. It is also advantageous to have one hand free while berthing to be able to push the watercraft away from obstacles. These latter two points cannot be emphasized enough, since even a relatively low-speed collision between an outboard motor and an obstruction can disable the watercraft, necessitating a costly repair and stranding the watercraft occupants.

As such, the watercraft operator is forced to operate the steering controls (or combination throttle/tiller controls) with one hand and use his free hand to perform all of the other previously mentioned functions. This obviously impairs the operator's ability to perform these other functions, including the operation of a hand-held spotlight, rendering it more difficult to navigate the watercraft and increasing the risk of a collision. Consequently, there remains a need in the art for a rearward facing illumination device which activates upon reversing the outboard motor and is positioned so as to assist in the rearward navigation of the watercraft.

SUMMARY OF THE INVENTION

It is one object of the present invention to provide a marine illumination device which will activate upon engaging the reverse mode of an outboard motor.

It is another object of the present invention to provide a marine illumination device for use with an outboard motor which can be operated in a "hands-free" manner.

It is a further object of the present invention to provide a marine illumination device which is mounted to an outboard motor in a manner to aid in the reverse navigation of a watercraft when activated.

In accordance with the present invention, a marine illuminating device is provided for aiding in the reverse navigation of a watercraft that is powered by an outboard motor. The marine illuminating device includes an electric light that is mounted in an aperture in a cowl of an outboard motor. The electric light is connected through an electric circuit to the alternator/charging system of the outboard motor and to a switch assembly. The switch assembly may be actuated automatically when the outboard motor mode selector is positioned into the reverse mode. Alternatively, the switch may also be actuated manually. Actuation of the switch assembly permits electric current to flow from the alternator/charging system to the electric light, thereby causing the electric light to illuminate. Operation of the device is "hands-free" due to the fact that it illuminates automatically and does not require the operator to actively position the light relative to the path of the watercraft since the watercraft travels in the direction that the outboard motor is pointed when the motor is operated in the reverse mode. The electric circuit may also employ a switching device to maintain the electric lamp in an illuminated state for a predetermined time to permit the watercraft operator to momentarily operate the outboard motor in the neutral or forward modes while maintaining rearward illumination.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
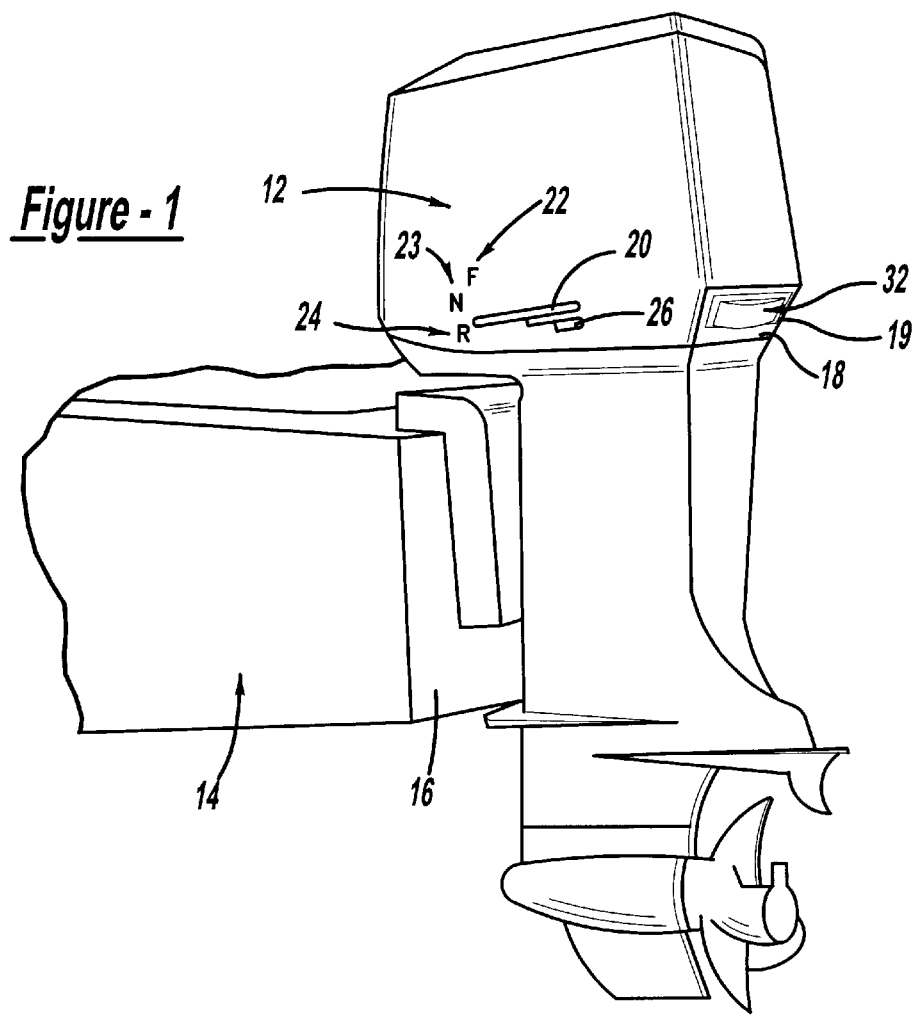
FIG. 1 is a side view of a watercraft equipped with an illumination device constructed in accordance with the teachings of a preferred embodiment of the present invention.

Referring to FIG. 1, the illumination device of the present invention is generally indicated by reference numeral 10. Illumination device 10 is shown to be operatively associated with an outboard motor 12. Outboard motor 12 is illustrated as being fixedly attached to the transom 16 of watercraft 14 in a conventional manner. Outboard motor 12 is shown to include a cowl 18, a mode selector 20, an alternator/charging system 21 and an illumination device 10. Mode selector 20 can be selectively positioned in a forward position 22, a neutral position 23 and a reverse position 24 to cause outboard motor 12 to operate in the forward, neutral or reverse modes, respectively. Cowl 18 covers at least a portion of the motor so as to protect the watercraft operator from injury due to contact with various motor components. Cowl 18 also prevents excess moisture from contacting the motor and prevents excess dirt from accumulating on the motor. Cowl 18 is shown to include a generally rectangular aperture 19.

Figure 2:
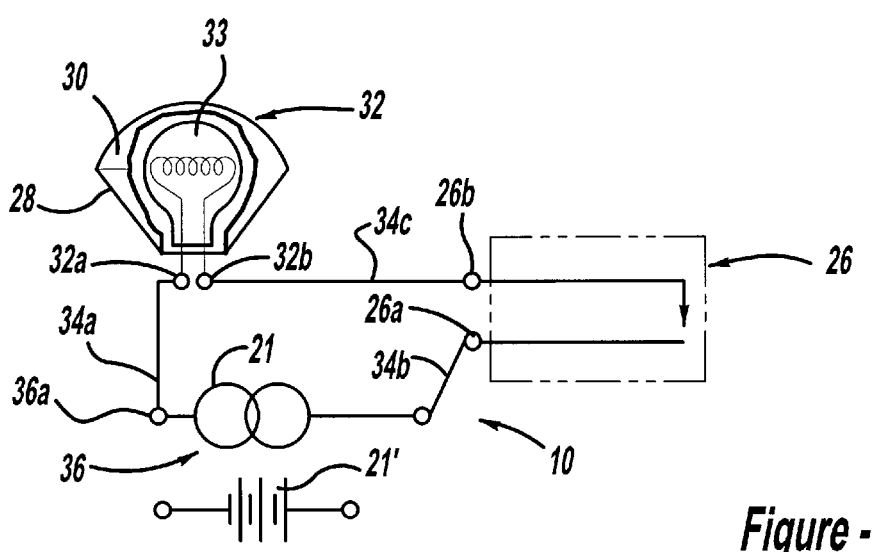
FIG. 2 is a schematic illumination of the illumination device of FIG. 1.

Referring to FIG. 2, an exemplary schematic illustration of an electrical circuit for illumination device 10 is shown. As illustrated the, circuit includes illumination device 10 and electrical source 36. Illumination device 10 includes an electric light assembly 32, a wire harness 34 and a switching assembly 26. Electric light assembly 32 is shown to include a reflector 28, a projector lens 30 and a lamp 33. Preferably, electric light assembly 32 is constructed in a manner so as to seal out moisture and resist vibration. A first electrical contactor 32a of electric light assembly 32 is connected by wire harness 34 through wire 34a to a first terminal 36a of electric source 36. Preferably, electric source 36 is the outboard motor's alternator 21 or charging system. Alternatively, the electrical source could be a battery 21'. Wire 34b connects the second terminal 36b of electrical source 36 to the input terminal 26a of switching assembly 26. Switching assembly 26 may include a limit switch, a proximity switch, or a manually actuated switch such as a push-button switch or a toggle switch. The output side 26b of switching assembly 26 is connected to second electrical contractor 32b of electric light assembly 32 through wire 34c. When unactuated, switching assembly 26 is operable for inhibiting electricity from passing from electric source 36 to electric light assembly 32. When actuated, switching assembly 26 is operable for allowing electricity to pass from electric source 36 to electric light assembly 32.

Referring back to FIG. 1, electric light assembly 32 is shown to be positioned within aperture 19 and fastened to cowl 18. Aperture 19 is formed in cowl 18 at a location that will orient electric light assembly 32 in its optimal position. As electric light assembly 32 is fixedly coupled to outboard motor 12, those skilled in the art will readily appreciate that the tilting of outboard motor 12 relative to transom 16 will permit electric light assembly 32 to be aimed in a desired manner. Alternatively, electric light assembly 32 could include conventional aiming hardware (not shown), similar to that used in automotive headlamps, so as to allow the watercraft operator to adjust the area of illumination to suit his individual needs. Such aiming hardware may be found in, for example, U.S. Pat. No. 5,758,943 to Shirai et al., U.S. Pat. No. 5,741,057 to Kusagaya, U.S. Pat. No. 5,678,915 to Shirai et al. and U.S. Pat. No. 4,809,139 to Ryder et al., the disclosures of which are hereby incorporated by reference as if fully set forth herein.

Switching assembly 26 is positioned so as to actuate when mode lever 20 is placed into the reverse position 24, which in turn causes electric light assembly 32 to illuminate. Moving mode lever 20 out of the reverse position 24 causes switching assembly 26 to return to its unactuated state and electric light assembly 32 is turned off.

Figure 3:
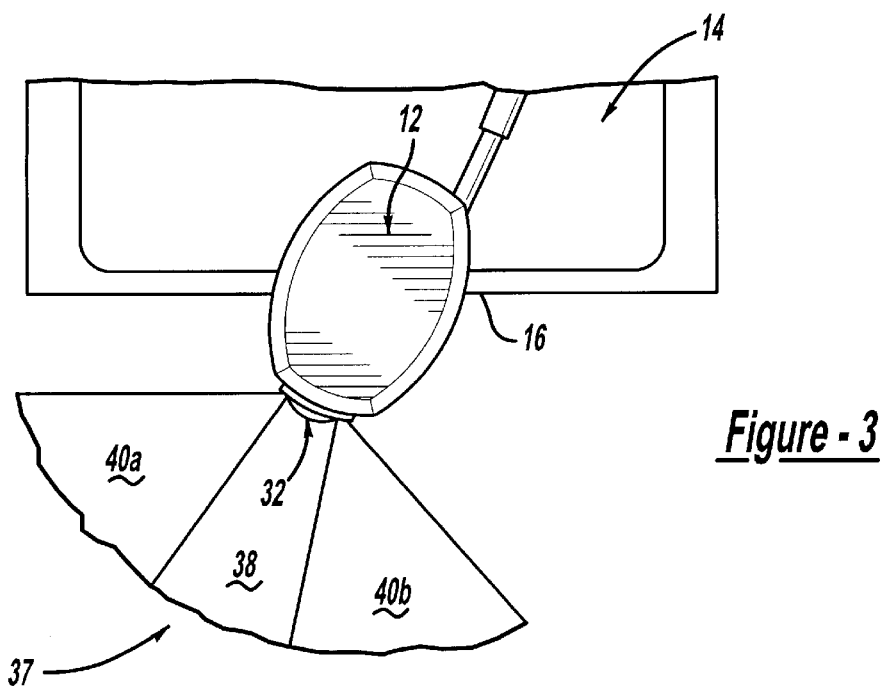
FIG. 3 is a top view of a watercraft illustrating the area of illumination created by the illumination device of FIG. 1.

A partial top view of a watercraft with an outboard motor having the illumination device of the present invention is shown in FIG. 3. In the preferred embodiment, reflector 28, projector lens 30 and lamp 33 combine to provide a multi-segment beam of light 37 having an intensely illuminated center beam segment 38 disposed between two diffuse beam segments 40a & 40b. Multi-segment beam 37 is produced so as to have a total included angle of approximately 120° to approximately 180°. Center beam segment 38 is produced to have an included angle ranging from approximately 5° to approximately 135° and preferably ranging from approximately 15° to approximately 90°. Configuration of the beam of light in this multi-segment fashion serves as both an aid to the navigation of the watercraft and a means for alerting others in the vicinity, particularly those in the water who were positioned within boundaries of center beam 38, that the watercraft is being operated in reverse. This latter feature is particularly advantageous during daylight hours when swimming activity is more likely to occur and the watercraft operator is unlikely to otherwise use a light or other device to designating that the watercraft is being operated in reverse.

While the illumination device of the present invention has been described thus far as being extending through an aperture in the cowl of an outboard motor and illuminating only when the outboard motor is operated in the reverse mode, those skilled in the art will appreciate that the invention, in its broader aspects, may be constructed somewhat differently. For example, the illumination device may be specifically configured to be mounted to an exterior surface of the outboard motor.

Figure 4:
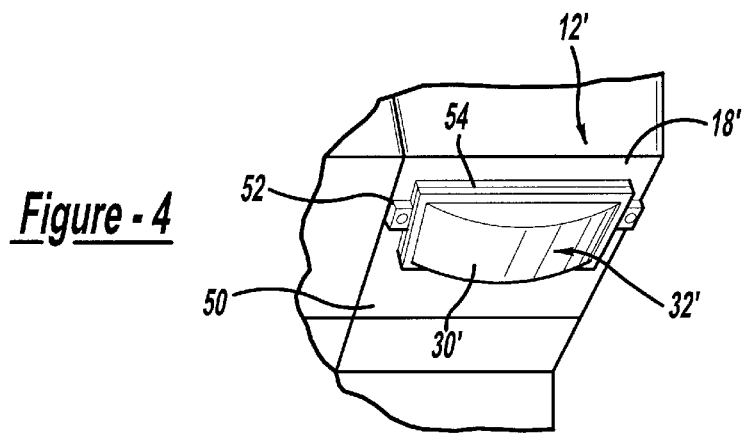
FIG. 4 is a partial side view of an outboard motor which incorporates an illumination device according a second preferred embodiment of the present invention.

In FIG. 4, the electric light assembly 32' of illumination device 10' is shown to be secured to an exterior surface 50 of cowl 18' through a conventional securing means 52 which could be comprised of fasteners, clips, adhesives, or adhesive tapes. Electric light assembly 32' includes a housing 54 in which reflector 28' and lamp 33' are installed. Projector lens 30' is fixedly but removably coupled to housing 54 so as to facilitate replacement of lamp 33'. This embodiment is particularly adapted for retro-fitting the illumination device of the present invention to a conventional outboard motor.

Figure 5:
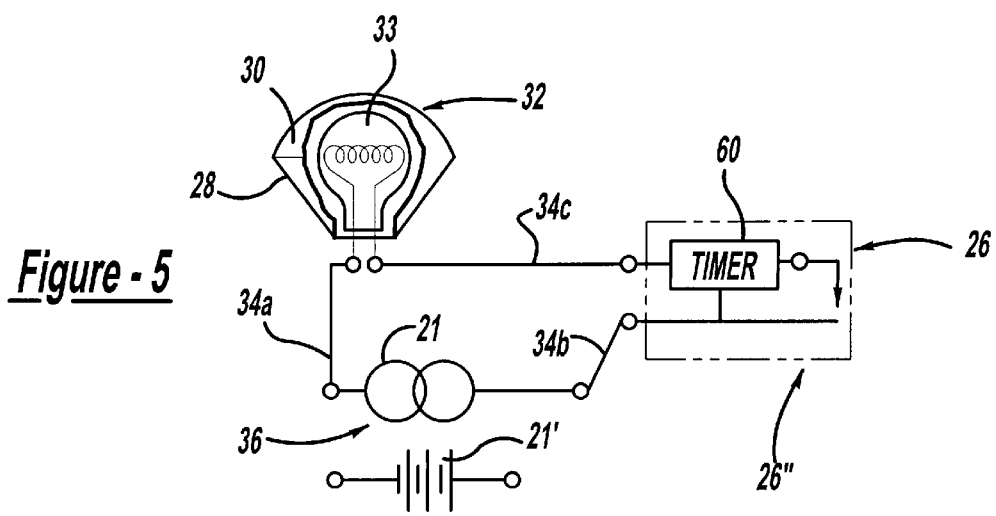
FIG. 5 is a schematic view of the illumination device constructing in accordance with the teachings of a third preferred embodiment of the present invention.

Another example, as illustrated in FIG. 5, shows switching assembly 26" to include a switching device 60, such as a timer, which maintains switching assembly 26″ in the actuated state for a predetermined time after mode selector 20 has been moved out of the reverse position 24. This feature is particular advantageous since watercraft operators frequently place the outboard motor in the neutral mode and manually "punt" the watercraft rearward and/or utilize the neutral and forward modes to adjust the position of the watercraft to avoid obstacles. In operation, switching assembly 26″ is actuated when mode selector 20 is placed in the reverse position 24. Upon removing mode selector 20 from the reverse position 24 (i.e., into neutral position 23 or forward position 22), switching device 60 is operable for maintaining switching assembly 26″ in the actuated state for a predetermined amount of time. At the expiration of the predetermined amount of time, switching assembly 26″ reverts to the unactuated state. If, however, mode selector 20 is returned to the reverse position 24 prior to the expiration of the predetermined amount of time, switching device 60 is stopped and reset. Electric light assembly 32 remains in an illuminated condition after switching device 60 is reset as the placement of mode selector 20 in the reverse position 24 actuates switching assembly 26″.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. An illumination device for use with an outboard motor having a power supply, a plurality of operating modes and a mode selector for selectively engaging said plurality of operating modes, said plurality of operating modes including a reverse mode, a neutral mode and a forward mode, said illumination device comprising:
    an electric light assembly adapted to be fixed to said outboard motor and positioned so as to illuminate an area behind said outboard motor; and
    a switching assembly coupled to said electric light assembly and operable in an actuated state and an unactuated state, said actuated state adapted for permitting the transmission of power from said power source to said electric light assembly and said unactuated state adapted for inhibiting the transmission of power from said power source to said electric light assembly;
    wherein said operation of said switching assembly in said actuated state aids in navigating said outboard motor in a rearward direction.

2. The illumination device of claim 1, wherein said switching assembly includes a manually actuated switch operable for maintaining said switching assembly in an actuated state.

3. The illumination device of claim 1, wherein said switching assembly is adapted to operate in said actuated state when said outboard motor is operated in said reverse mode.

4. The illumination device of claim 3, wherein said switching assembly includes a limit switch adapted for sensing when said outboard motor is operated in said reverse mode.

5. The illumination device of claim 3, wherein said switching assembly includes a proximity switch adapted for sensing when said outboard motor is operated in said reverse mode.

6. The illumination device of claim 3, wherein said switching assembly includes a switching means adapted to maintain said switching assembly in said actuated state for a predetermined time after said outboard motor has been operated in said reverse mode.

7. The illumination device of claim 1, wherein said electric light assembly includes a lamp, a reflector and a projector lens, said lamp adapted for creating light and said reflector and projector lens adapted for concentrating and focusing said light so as to produce a multi-segment beam having an intense center segment disposed between two segments which provide diffuse light.

8. The illumination device of claim 7, wherein said center beam segment is produced so as to have an included angle of approximately 5° to approximately 135°.

9. The illumination device of claim 8, wherein said center beam segment is produced so as to have an included angle of approximately 15° to approximately 90°.

10. The illumination device of claim 1 further comprising means for adjusting a position of a beam of light produced by said electric light assembly.

11. An outboard motor comprising:
    a housing;
    a power supply coupled to said housing and providing a source of electricity;
    a mode selector for selectively engaging one of a plurality of operating modes, the plurality of operating modes including a reverse mode, a neutral mode and a forward mode; and
    an illumination device having an electric light assembly and a switching assembly, said electric light assembly coupled to said housing and positioned so as to illuminate an area behind said outboard motor, said switching assembly coupled to said electric light assembly and operable in an actuated state and unactuated states, said actuated state operable for permitting the transmission of electricity from said power source to said electric light assembly and said unactuated state adapted for inhibiting the transmission of power from said power source to said electric light assembly;
    wherein said operation of said switching assembly in said actuated state aids in navigating said outboard motor in a rearward direction.

12. The outboard motor of claim 11, wherein said switching assembly includes a manually actuated switch operable for maintaining said switching assembly in an actuated state.

13. The outboard motor of claim 11, wherein said switching assembly is operable in said actuated state when said outboard motor is operated in said reverse mode.

14. The outboard motor of claim 13, wherein said switching assembly includes a limit switch operable for sensing when said outboard motor is operated in said reverse mode.

15. The outboard motor of claim 13, wherein said switching assembly includes a proximity switch operable for sensing when said outboard motor is operated in said reverse mode.

16. The outboard motor of claim 13, wherein said switching assembly includes a switching means operable for maintaining said switching assembly in said actuated state for a predetermined time after said outboard motor has been operated in said reverse mode.

17. The outboard motor of claim 11, wherein said electric light assembly includes a lamp, a reflector and a projector lens, said lamp operable for creating light and said reflector and projector lens operable for concentrating and focusing said light so as to produce a multi-segment beam having an intense center segment disposed between two segments which provide diffuse light.

18. The outboard motor of claim 17, wherein said center beam segment is produced so as to have an included angle of approximately 5° to approximately 135°.

19. The outboard motor of claim 18, wherein said center beam segment is produced so as to have an included angle of approximately 15° to approximately 90°.

20. The outboard motor of claim 11, further comprising means for adjusting a position of a beam of light produced by said electric light assembly.

21. The outboard motor of claim 11, wherein said power supply is a battery.

22. The outboard motor of claim 11, wherein said power supply is an alternator.

* * * * *